US012161593B2

(12) United States Patent
Zeng

(10) Patent No.: US 12,161,593 B2
(45) Date of Patent: Dec. 10, 2024

(54) MULTI-DIRECTIONAL ADJUSTABLE CHAIR BED

(71) Applicant: Guohong Zeng, Qingyuan (CN)

(72) Inventor: Guohong Zeng, Qingyuan (CN)

( * ) Notice: Subject to any disclaimer, the term of this patent is extended or adjusted under 35 U.S.C. 154(b) by 63 days.

(21) Appl. No.: 17/646,300

(22) Filed: Dec. 29, 2021

(65) Prior Publication Data

US 2022/0117811 A1 Apr. 21, 2022

(30) Foreign Application Priority Data

Dec. 6, 2021 (CN) ......................... 202111481571.8

(51) Int. Cl.
*A61G 7/015* (2006.01)
*A61G 7/053* (2006.01)

(52) U.S. Cl.
CPC ............ *A61G 7/015* (2013.01); *A61G 7/053* (2013.01)

(58) Field of Classification Search
None
See application file for complete search history.

(56) References Cited

U.S. PATENT DOCUMENTS 10,729,253 B1 * 8/2020 Gaunt .................. A47C 27/082
2013/0212807 A1 8/2013 Manson et al.
2014/0259388 A1 * 9/2014 Manson ................. A47C 17/16 5/690
2019/0070049 A1 3/2019 Goodrich

* cited by examiner

*Primary Examiner* — Adam C Ortiz
(74) *Attorney, Agent, or Firm* — Zhigang Ma

(57) ABSTRACT

The present disclosure discloses a multi-directional adjustable chair bed, including a bedstead and a bed plate group, the bed plate group being capable of moving between a bed head and a bed tail of the bedstead by means of sliding fit between a framework of the bed plate board and the bedstead; a first electric telescopic rod, a fixed end of which is mounted on the bedstead and an extending end of which is telescopic in a lengthwise direction of the bedstead, an extending stroke of the extending end including a first stroke and a second stroke; and a hip connection member rotatably arranged on a hip bed plate of the bed plate group and hinged to the extending end of the first electric telescopic rod.

9 Claims, 2 Drawing Sheets

MULTI-DIRECTIONAL ADJUSTABLE CHAIR BED

TECHNICAL FIELD

The present disclosure relates to the technical field of electric beds, in particular to a multi-directional adjustable chair bed.

BACKGROUND

A nursing bed used for the elderly in the existing art has simple functions, can only simply change the patient's lying posture, and cannot provide a good assistance effect for the elderly to get in and out of the bed. Physically inconvenienced elderly need to be supported with hands to move in the process of getting in and out of the bed, which is very inconvenient for patient's movement.

SUMMARY

The present disclosure aims to provide a multi-directional adjustable chair bed which can deform to comply with different postures and also have a stand-up assisting function by means of improving a cooperation method between a bed plate group and a bedstead.

In order to achieve the above-mentioned objective, the present disclosure provides a multi-directional adjustable chair bed, including:

a bedstead and a bed plate group, the bed plate group being capable of moving between a bed head and a bed tail of the bedstead by means of sliding fit between a framework of the bed plate board and the bedstead;

a first electric telescopic rod, a fixed end of which is mounted on the bedstead and an extending end of which is telescopic in a lengthwise direction of the bedstead, an extending stroke of the extending end including a first stroke and a second stroke; and a hip connection member rotatably arranged on a hip bed plate of the bed plate group and hinged to the extending end of the first electric telescopic rod.

In the first stroke of the extending end, the first electric telescopic rod drives, through the hip connection member, the bed plate group to move towards the bed tail; and in the second stroke of the extending end, the extending end of the first electric telescopic rod enables, through the hip connection member, a bed head end of the hip bed plate to upwarp.

Preferably, the fixed end of the first electric telescopic rod is rotatably connected to a bed head side of the bedstead.

Preferably, a connection body is further included; two ends of the connection body are rotatably connected to the bedstead and a bed tail side of a crus bed plate in the bed plate group; and in particular, when the extending end of the first electric telescopic rod finishes the first stroke, the bed tail end of the connection body is located outside the bedstead.

Preferably, when the extending end of the first electric telescopic rod executes the second stroke, the connection body swings downwards, and the crus bed plate passes through the bed tail from a position above the bedstead and moves downwards.

Preferably, when the extending end of the first electric telescopic rod finishes the second stroke, the crus bed plate is vertically stored at the bed tail of the bedstead.

Preferably, when the extending end of the first electric telescopic rod reversely executes the first stroke, the connection body swings upwards, and the crus bed plate upwarps towards the bed tail side.

Preferably, a thigh bed plate is rotatably connected between the hip bed plate and the crus bed plate, and the bed head side of the hip bed plate is rotatably connected with a back bed plate; in particular:

a second electric telescopic rod is arranged between the back bed plate and the hip bed plate and is used to adjust an inclination angle of the back bed plate;

a third electric telescopic rod is arranged between the thigh bed plate and the hip bed plate and is used to adjust an inclination angle of the thigh bed plate.

Preferably, the bedstead is provided with a main rail, and the framework is in sliding fit with the bedstead through a main rail wheel.

Preferably, the hip connection member includes a shaft body, a shaft sleeve and a connection frame, in particular:

the shaft body is fixed on the framework and is located below the hip bed plate in a height direction; the shaft sleeve is rotatably sleeved on the shaft body; one end of the connection frame is fixed to the shaft sleeve and the other end is in sliding fit with the hip bedstead, so that the bed head side of the connection frame is inclined upwards; and the extending end of the first electric telescopic rod is hinged to the connection frame.

Preferably, the hip bed plate is provided with an auxiliary rial, and the bed head end of the connection frame is slidably arranged in the auxiliary rail through an auxiliary rail wheel.

The present disclosure has the following beneficial effects:

According to the multi-directional adjustable chair bed of the present disclosure, the two ends of the first electric telescopic rod are respectively connected to the bedstead and the hip bed plate on the bed plate group, and the bed plate group is slidably arranged on the bed frame through the framework; furthermore, the hip connection member is arranged between the hip bed plate and the extending end of the first electric telescopic rod; the movement of the bed plate group and the upwarp of the hip connection member are used to form the first stroke and the second stroke for the extending end of the first electric telescopic rod; in the first stroke, the entire bed plate group is moved towards the bed tail; and in the second stroke, the hip connection member upwarps, so that the chair bed has a stand-up assisting function.

BRIEF DESCRIPTION OF THE DRAWINGS

The accompanying drawings described here are used to provide a further understanding of the present disclosure and form a part of the present disclosure. The schematic embodiments and descriptions of the present disclosure are used to explain the present disclosure and do not constitute an improper limitation on the present disclosure. In the drawings.

DETAILED DESCRIPTION OF THE EMBODIMENTS

The implementation modes of the present disclosure will be described in detail in conjunction with the accompanying drawings and embodiments, so as to fully understand and implement a realizing process of how the present disclosure applies technical means to solve technical problems and achieve technical effects.

Figure 1:
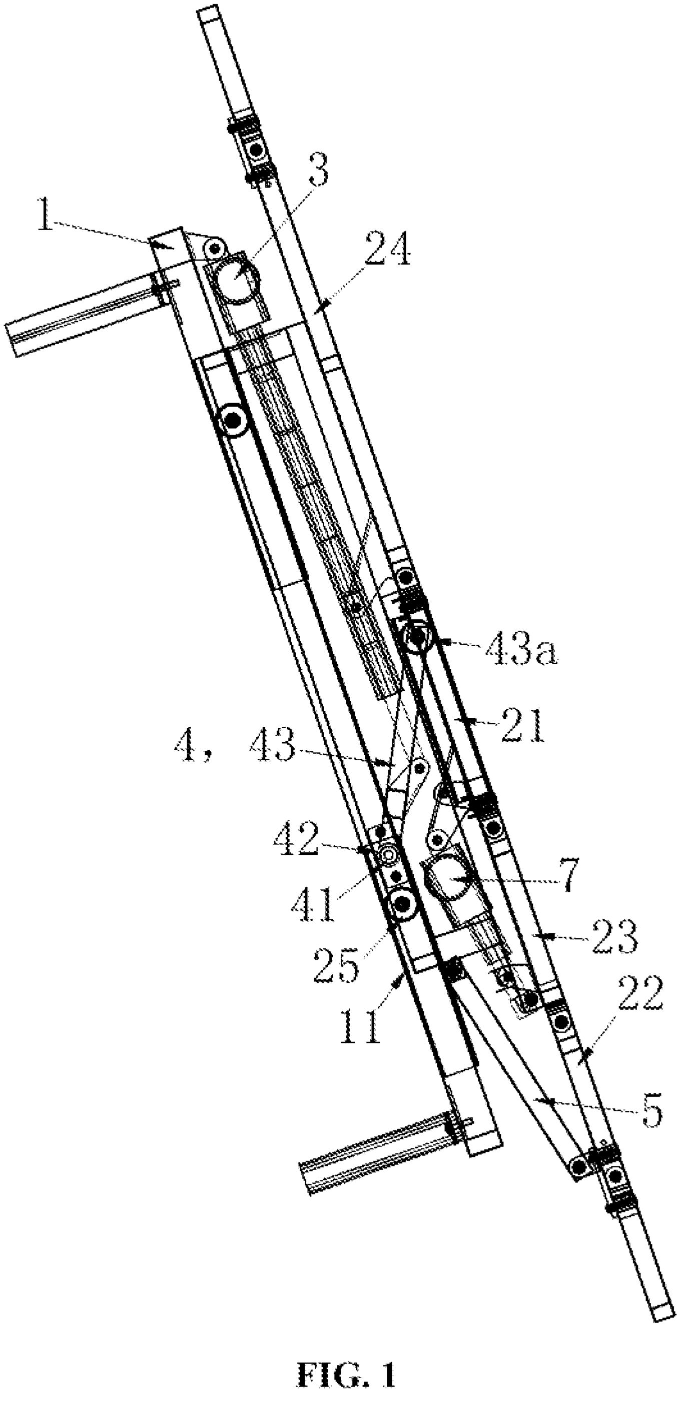
FIG. 1 is a side view when a multi-directional adjustable chair bed of the present disclosure is placed horizontally.
Figure 2:
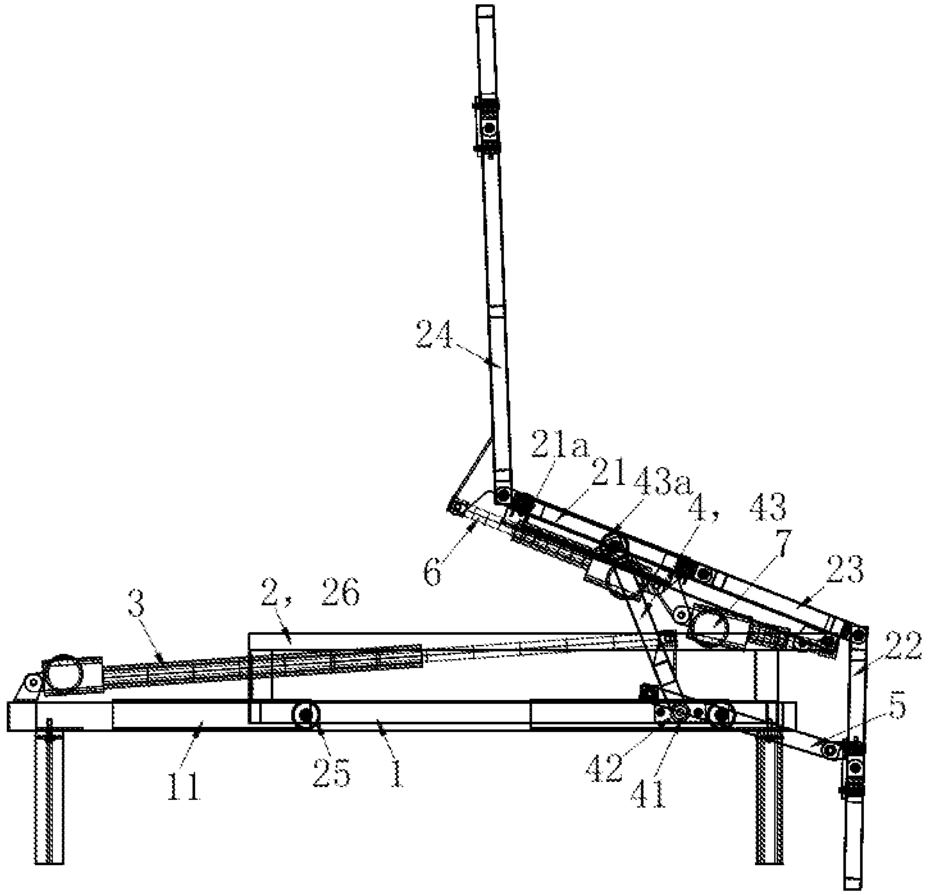
FIG. 2 is a side view when a multi-directional adjustable chair bed of the present disclosure assists in standing up.

Referring to FIG. 1 and FIG. 2, the present disclosure provides a multi-directional adjustable chair bed, including:

a bedstead 1 and a bed plate group 2, the bed plate group 2 being capable of moving between a bed head and a bed tail of the bedstead 1 by means of sliding fit between a framework 26 of the bed plate board 2 and the bedstead 1;

a first electric telescopic rod 3, a fixed end of which is mounted on the bedstead 1 and an extending end of which is telescopic in a lengthwise direction of the bedstead 1, an extending stroke of the extending end including a first stroke and a second stroke, and when the extending end finishes one complete extending stroke, the second stroke being executed after the first stroke; and a hip connection member 4 rotatably arranged on a hip bed plate 21 of the bed plate group 2 and hinged to the extending end of the first electric telescopic rod 3, the hip bed plate 21 being rotatable relative to the framework 26 so that it has an upwarp or horizontal state of a bed head side. In particular:

in the first stroke of the extending end, the first electric telescopic rod 3 drives, through the hip connection member 4, the bed plate group 2 to move towards the bed tail. At this time, the extending end applies a thrust to the hip bed plate 21 through the hip connection member 4, and the hip bed plate 21 transmits the thrust to the framework 26, so that the whole bed plate group 2 moves on the bedstead 1 from the bed head to the bed tail. In the second stroke of the extending end, the extending end of the first electric telescopic rod 3 enables, through the hip connection member 4, the bed head end of the hip bed plate 21 to upwarp. Specifically, the framework 26 is disposed to move on the bedstead 1 towards one side of the bed tail to the farthest point when the extending end of the first electric telescopic rod 3 finishes the first stroke; therefore, in the process that the extending end of the first electric telescopic rod 3 executes the second stroke, the bedstead 1 cannot move, so that the extending end pushes the hip connection member 4 to enable the hip bed plate 21 to be switched from a horizontal state to an upwarp state; in this process, the back of the boy and parts above the back of people lying on the bed can be lifted, thus realizing a stand-up assisting function; meanwhile, in combination with the bed plate group 2, in the first stroke of the first electric telescopic rod 3, people in the bed moves with the bed plate group 2 on the bedstead 1 towards the bed tail, so that it is more convenient for people to get up and leave a bed body.

In particular, the fixed end of the first electric telescopic rod 3 is rotatably connected to the bed head side of the bedstead 1. In this way, when the extending end of the first electric telescopic rod 3 executes the second stroke, the overall first electric telescopic rod 3 will upwarp, so as to ensure that the stand-up assisting function is realized; and at the same time, the inclined state of the first electric telescopic rod isused to cooperate with the inclined state of the hip bed plate 21 to realize triangular supporting, which is stabler.

Further, a connection body 5 is further included; two ends of the connection body 5 are respectively rotatably connected to the bedstead 1 and a bed tail side of a crus bed plate 22 in the bed plate group 2. In particular, when the extending end of the first electric telescopic rod 3 finishes the first stroke, the bed tail end of the connection body 5 is located outside the bedstead 1; the crus bed plate 22 is designed in a manner of corresponding to the crus position of a user; the connection body 5 may be platy, tubular, or of other shapes, as long as its two ends are respectively rotatably connected to the bedstead 1 and the crus bed plate 22. In this way, since one end of the connection body 5 is rotatably connected to the bedstead 1, when the first electric telescopic rod 3 extends and retracts, the end of the connection body 5 connected to the crus bed plate 22 rotates relative to the end connected to the bedstead 1, and the rotation is used to change the height of the crus bed plate 22, so that when the extending end of the first electric telescopic rod 3 is in a completely retracted state and a completely extended state, the height and the state of the crus bed plate 22 can be set; furthermore, after the extending end of the first electric telescopic rod 3 finishes the second stroke, the end of the connection body 5 connected to the crus bed plate 22 is located outside the bedstead 1 in a lengthwise direction and a width direction, so that at this time, the crus bed plate 22 may swing downwards to place the crus of the user on the ground in a bent state, thereby further enhancing the stand-up assisting function. Specifically, when the extending end of the first electric telescopic rod 3 executes the second stroke, the connection body 5 swings downwards, and the crus bed plate 22 passes through the bed tail from a position above the bedstead 1 and moves downwards. By this process, the user can directly control the extending stroke of the first electric telescopic rod 3 according to a need, so as to realize upwarping of the hip bed plate 21 and descending of the crus bed plate 22 to perfectly enjoy the stand-up assisting function.

In particular, when the extending end of the first electric telescopic rod 3 finishes the second stroke, the crus bed plate 22 is vertically stored at the bed tail of the bedstead 1. In this way, on the one hand, when the stand-up assisting function is realized, the crus of the user bends or is placed on the ground; and at the same time, the thigh bed plate 22 is in a stored state to make the stand-up assisting function better.

In particular, when the extending end of the first electric telescopic rod 3 reversely extends the first stroke, the connection body 5 swings upwards, so that the thigh bed plate 22 upwarps towards the bed tail side. In this way, the user still uses the first electric telescopic rod 3, and the retracting stroke of the extending end is applied to lying of the hip and parts above the hip of the body; and at the same time, the crus part is lifted up with the upwarping of the crus bed plate 22 to realize a left raising function.

Further, a thigh bed plate 23 is rotatably connected between the hip bed plate 21 and the crus bed plate 22, and the bed head side of the hip bed plate 21 is rotatably connected with a back bed plate 24; in particular, a second electric telescopic rod 6 is arranged between the back bed plate 24 and the hip bed plate 21 and is used to adjust an inclination angle of the back bed plate 24; a third electric telescopic rod 7 is arranged between the thigh bed plate 23 and the hip bed plate 21 and is used to adjust an inclination angle of the thigh bed plate 23. The thigh bed plate 23 and the back bed plate 24 cooperate with the hip bed plate 21 and the crus bed plate 22, so that when the hip bed plate 21 and the crus bed plate 22 are in different states, the states of the back bed plate 24 and the thigh bed plate 23 are directly adjusted to realize various forms and cooperate with various postures of the user, thereby improving the comfort.

In particular, the bedstead 1 is provided with a main rail 11; the framework 26 is in sliding fit with the bedstead 1 through a main rail wheel 25; and each of two inner side surfaces of the bedstead 1 is provided with one main rail 11 to support and guide the movement of the bed plate group 2.

The hip connection member 4 includes a shaft body 41, a shaft sleeve 42, and a connection frame 43. In particular, the shaft body 41 is fixed on the framework 26 and is located below the hip bed plate 21 in a height direction; the shaft sleeve 42 is rotatably sleeved on the shaft body 41; one end of the connection frame 43 is fixed to the shaft sleeve 42 and the other end is in sliding fit with the hip bedstead 1, so that the bed head side of the connection frame 43 is inclined upwards; and the extending end of the first electric telescopic rod 3 is hinged to the connection frame 43. The hip bed plate 21 is provided with an auxiliary rial 21*a*, and the bed head end of the connection frame 43 is slidably arranged in the auxiliary rail 21*a* through an auxiliary rail wheel 43*a*. An inner wall of each of two sides of the hip bed plate 21 is provided with one auxiliary rail 21*a* used to move relative to the hip bed plate 21 when the connection frame 43 pushes the hip bed plate 21 to rotate, so as to realize the stand-up assisting function.

For example, certain words are used in the specification and claims to refer to specific assemblies. Those skilled in the art should understand that hardware manufacturers may use different names to refer to the same assembly. This specification and claims do not use differences in names as a way to distinguish assemblies, but use differences in functions of assemblies as a criterion for distinguishing. If "including" mentioned in the entire specification and claims is an open term, it should be interpreted as "including but not limited to". "Approximately" means that within an acceptable error range, those skilled in the art can solve the technical problem within a certain error range and basically achieve the technical effect.

It should be noted that the terms "comprise", "include", or any other variation thereof are intended to cover a non-exclusive inclusion, so that an article or system that includes a list of elements includes those elements and further includes other elements not expressly listed or further includes elements inherent to such an article or system. Without more constraints, an element preceded by "includes a . . . " does not preclude the existence of additional identical elements in the article or system that includes the element.

The above description shows and describes several preferred embodiments of the present disclosure. However, as mentioned above, it should be understood that the present disclosure is not limited to the form disclosed herein and should not be regarded as the exclusion of other embodiments, but can be used for various other combinations, modifications, and environments. The present disclosure can be changed within the conceived scope of this application by means of the above teachings or technologies or knowledge in the related art. The modifications and changes made by those skilled in the art do not depart from the spirit and scope of the present disclosure, and shall all fall within the protection scope of the appended claims of the present disclosure.

What is claimed is:

1. A multi-directional adjustable chair bed, comprising: a bedstead and a bed plate group, the bed plate group being capable of moving between a bed head and a bed tail of the bedstead by means of sliding fit between a framework of the bed plate board and the bedstead; a first electric telescopic rod, a fixed end of which is mounted on the bedstead and an extending end of which is telescopic in a lengthwise direction of the bedstead, an extending stroke of the extending end including a first stroke and a second stroke; and a hip connection member rotatably arranged on a hip bed plate of the bed plate group and hinged to the extending end of the first electric telescopic rod, wherein in the first stroke of the extending end, the first electric telescopic rod drives, through the hip connection member, the bed plate group to move towards the bed tail; and in the second stroke of the extending end, the extending end of the first electric telescopic rod enables, through the hip connection member, a bed head end of the hip bed plate to move upward, the hip connection member comprises a shaft body, a shaft sleeve and a connection frame, wherein the shaft body is fixed on the framework and is located below the hip bed plate in a height direction: the shaft sleeve is rotatably sleeved on the shaft body: one end of the connection frame is fixed to the shaft sleeve and the other end is in sliding fit with the hip bedstead, so that the bed head side of the connection frame is inclined upwards: and the extending end of the first electric telescopic rod is hinged to the connection frame.

2. The multi-directional adjustable chair bed according to claim 1, wherein the fixed end of the first electric telescopic rod is rotatably connected to a bed head side of the bedstead.

3. The multi-directional adjustable chair bed according to claim 1, further comprising a connection body, wherein two ends of the connection body are rotatably connected to the bedstead and a bed tail side of a leg bed plate in the bed plate group, wherein when the extending end of the first electric telescopic rod finishes the first stroke, the bed tail end of the connection body is located outside the bedstead.

4. The multi-directional adjustable chair bed according to claim 3, wherein when the extending end of the first electric telescopic rod executes the second stroke, the connection body swings downwards, and the leg bed plate passes through the bed tail from a position above the bedstead and moves downwards.

5. The multi-directional adjustable chair bed according to claim 4, wherein when the extending end of the first electric telescopic rod finishes the second stroke, the leg bed plate is vertically stored at the bed tail of the bedstead.

6. The multi-directional adjustable chair bed according to claim 3, wherein when the extending end of the first electric telescopic rod reversely executes the first stroke, the connection body swings upwards, and the leg bed plate moves upwards towards the bed tail side.

7. The multi-directional adjustable chair bed according to claim 3, wherein a thigh bed plate is rotatably connected between the hip bed plate and the leg bed plate, and the bed head side of the hip bed plate is rotatably connected with a back bed plate, wherein a second electric telescopic rod is arranged between the back bed plate and the hip bed plate and is used to adjust an inclination angle of the back bed plate; a third electric telescopic rod is arranged between the thigh bed plate and the hip bed plate and is used to adjust an inclination angle of the thigh bed plate.

8. The multi-directional adjustable chair bed according to claim 1, wherein the bedstead is provided with a main rail, and the framework is in sliding fit with the bedstead through a main rail wheel.

9. The multi-directional adjustable chair bed according to claim 1, wherein the hip bed plate is provided with an auxiliary rail, and the bed head end of the connection frame is slidably arranged in the auxiliary rail through an auxiliary rail wheel.

* * * * *